United States Patent [19]

Greer, Jr.

[11] Patent Number: 4,764,908

[45] Date of Patent: * Aug. 16, 1988

[54] MAGNETOHYDRODYNAMIC FLUID TRANSDUCER

[76] Inventor: Sedley J. Greer, Jr., Ste. 211, 4618 J. F. Kennedy Blvd., North Little Rock, Ark. 72116

[*] Notice: The portion of the term of this patent subsequent to Apr. 15, 2003 has been disclaimed.

[21] Appl. No.: 850,520

[22] Filed: Apr. 11, 1986

Related U.S. Application Data

[63] Continuation-in-part of Ser. No. 444,988, Nov. 29, 1982, Pat. No. 4,583,207.

[51] Int. Cl.$^4$ .............................................. G01V 1/18
[52] U.S. Cl. .................................. 367/178; 367/188; 324/207; 73/654
[58] Field of Search ......... 73/517 A, 516 R, 516 LM, 73/652, 654; 181/122, 401; 324/204, 207; 367/178, 175, 185, 186, 187, 188, 166

[56] References Cited

U.S. PATENT DOCUMENTS

| | | | |
|---|---|---|---|
| 957,242 | 5/1910 | Noeggerath | 310/11 |
| 2,677,270 | 5/1954 | Sanderson | 73/659 |
| 2,683,867 | 7/1954 | Vann | 367/186 |
| 2,712,124 | 6/1955 | Ording, Jr. | 367/43 |
| 2,748,370 | 5/1956 | Baltosser | 367/187 |
| 2,759,552 | 8/1956 | Ording | 367/178 |
| 3,161,789 | 12/1964 | Nagamatsu et al. | 310/11 |
| 3,360,772 | 12/1967 | Massa | 367/188 |
| 3,436,918 | 4/1969 | Brogan et al. | 376/319 |
| 3,474,405 | 10/1981 | Padberg, Jr. | 367/2 |
| 3,546,499 | 12/1970 | Somers | 310/11 |
| 3,549,915 | 12/1970 | Prem | 310/11 |
| 3,636,389 | 1/1972 | Petrick | 310/11 |
| 3,705,317 | 12/1972 | Prem | 310/11 |
| 3,806,909 | 4/1974 | Boond | 310/367 |
| 3,930,218 | 12/1975 | Hall, Jr. | 367/188 |
| 4,218,629 | 8/1980 | Kayukawa et al. | 310/11 |
| 4,336,460 | 6/1982 | Best et al. | 250/560.1 |
| 4,418,294 | 11/1983 | Rahman | 310/11 |
| 4,419,895 | 12/1983 | Fuller | 73/517 A |
| 4,583,207 | 4/1986 | Greer, Jr. | 367/178 |

OTHER PUBLICATIONS

Modern Dictionary of Electronics Fourth Ed., p. 184.

*Primary Examiner*—Charles T. Jordan
*Assistant Examiner*—Brian S. Steinberger
*Attorney, Agent, or Firm*—Stephen D. Carver

[57] ABSTRACT

Magnetohydrodynamic (MHD) perturbation sensing apparatus. A rigid, shock resistant enclosure provides a housing having a sealed interior, in which a magnetohydrodynamic sensor and associated electronics are disposed. A hollow tubular conduit having an internal channel containing an electrically conductive fluid such as mercury or an electrolyte is of preferably ring shaped dimensions. The electrically conductive fluid is subject to perturbation-responsive movement within the ring. A very strong magnetic field is set up perpendicularly with respect to the plane occupied by the conduit by at least one pair of spaced apart magnets which have opposite poles disposed in a line generally normal to the plane of the conduit. One or more pairs of electrodes are secured to the conduit in a position normal to the magnetic field whereby to sense perturbations. In one embodiment a generally disc-shaped body substantially encapsulates a generally rectilinear, centrally disposed magnetic array and a cooperating ring-shaped or circular channel through which the electrically conductive fluid may move in response to perturbations. Fluid disposed within the channel may also be forced to move by MHD phenomena. A pair of drive electrodes and a pair of sensing electrodes are provided for information derivation and control. A plug may be disposed concentrically within the housing, and a pair of voids are formed on opposite sides thereof between the plug and the inner periphery of an electrode ring. Preferably a fluid such as nitrogen gas is filled within this region to provide pressure compensation in response to movement of electrically conductive fluid.

12 Claims, 6 Drawing Sheets

MAGNETOHYDRODYNAMIC FLUID TRANSDUCER

CROSS REFERENCE TO RELATED APPlICATION

This application is a continuation-in-part of an application for a MAGNETOHYDRODYNAMIC GEOPHONE, Ser. No. 444,988, filed Nov. 29, 1982 by the same applicant herein, now U.S. Pat. No. 4,583,207, issued Apr. 15, 1986.

BACKGROUND OF THE INVENTION

The present invention is directed to magnetohydrodynamic sensing devices. More particularly the present invention is concerned with magnetohydrodynamic perturbation sensing apparatus of extremely shock resistant characteristics.

In the prior art a variety of seismological sensing apparatus has been proposed for monitoring various forms of disturbances or shock waves. These shock waves may be generated in response to earthquakes, tests of nuclear warheads, or from other conventional sources such as the hydraulic vibrators or conventional explosions employed in the oil industry to locate sub-surface oil deposits. When an earthquake occurs, a sudden release of accumulated strain results in the propagation of a number of different types of seismological waves. Geophones have previously been employed to measure various parameters associated with earthquakes, such as the velocity of sub-surface movement of waves, the rate of change of the velocity, and the duration of the event. Shear waves, or S-waves, are the primary signal generated by an earthquake. When an extreme disturbance occurs in an homogeneous environment, a spherical front is generated, and a P-wave results. Such a wave is characterized by alternating compression and rarefaction through the sub-surface of the earth, somewhat similar to the structure of sound waves in air. Nuclear blasts in conjunction with underground tests primarily radiate P-waves.

At the interface of the earth with air Rayleigh waves are generated. Such waves are associated with both earthquakes and underground nuclear tests. Love waves are generated primarily from earthquakes, and are generally transverse to the direction of travel of Rayleigh waves. A wide variety of other complex waveforms resulting from reflection and refraction effects axe also known in seismology. A useful discussion of waves, along with recitation of the possibility of monitoring such waves for purposes of policing a total test ban treaty, is discussed in *Scientific American*, volume 247, No. 4, pages 47–55, October, 1982.

In the prior art a variety of geophones and/or seismometars have been proposed. Essentially known prior art devices include a rigid, generally conically shaped outer casing or enclosure housing an internal element of some form for sensing vibration. A variety of different sensors and/or transducers have been proposed to originate an electrical signal corresponding to seismological vibration. For example, Hayes in U.S. Pat. No. 1,980,993 discloses a sealed chamber in which pneumatic pressure results in the generation of an electrical signal in response to seismological vibration. Bound in U.S. Pat. No. 3,806,909 employs an internal piezoelectric element sensitive to soil stresses for generating a seismological responsive signal. Massa in U.S. Pat. No. 3,360,772 proposes a geophone in which a bilaminar piezoelectric element is suspended across an interior within the geophone housing for sensing vibrations and producing a proportional electrical signal.

The seismometer proposed by Baltosser in U.S. Pat. No. 2,748,370 contemplates the use of an electromagnetic sensor system interiorly of the casing for producing vibration sensing. Ording in U.S. Pat. Nos. 2,712,124 and 2,759,552 also discloses electromagnetic means for generating a proportional electrical signal. Sanderson in U.S. Pat. No. 2,677,270 senses vibration in response to the differential conductivity within a fluid medium as a gaseous bubble confined within a fluid chamber moves about in response to sudden seismological vibration. Other less relevant art known to me includes U.S. Pat. Nos. 2,683,867 and 3,474,405.

Seismological sensing technology relates generally to the broader science of perturbation monitoring. Physically shock resistive but sensitive motion sensors similar to the heart of the geophone in the aforedescribed co-pending patent application are of necessity in a wide variety of applications. Thus velocity meters, accelerometers, and servo-motion sensors commonly find usage within geophones, impact gauges, stethoscopes, inertial sensors, inertial guidance systems, vibration measuring systems, hydrophonic sensing instrumentation and the like.

A basic magnetohydrodynamic sensor embodies the capability of being useful in the three major modes of motion sensing (those being displacement meter, velocity meter, and accelerometer), either by direct transducer design or by servo-design.

Displacement meters are motion sensors whose natural period of vibration is larger than the period of frequency of the perturbation being measured. Such instruments indicate the actual linear displacement magnitude of the perturbation. Velocity meters are motion sensors whose signal output in response to perturbations is in direct proportion to the perturbation behaviour characteristics. Such instruments indicate the velocity of the motion being measured. Accelerometers are motion sensors which normally have natural periods of vibration which are shorter in duration than the frequency of incoming perturbations. Such sensors produce signal logic capable of measuring the acceleration of incoming measured perturbations. Velocity meters may be converted into accelerometers by the use of well known differentiator circuits. In the practice of seismology an earthquake-measuring instrumentation platform will commonly have all three types of motion sensors in use so that displacement, velocity, and acceleration can be logged concurrently.

Servo-motion sensors are designed to reduce the influence of mechanical losses during perturbation such as friction and "sloshing" of the working fluid medium inside of the sensors. By utilizing a small segment of electricity produced by the initial flow of the fluid within the device, the sensor mechanism has the capacity to utilize this electricity to trigger a counter-current which stops the flow of the fluid in the tube. In some cases, one can more accurately determine the actual amount of electrical current it takes to stop the flow of the liquid than one can accurately measure the direct flow of the fluid within the tube.

In the trade, velocity meters, accelerometers, and servo-motion sensors commonly find usage in such applications as geophones seismometers, impact gauges, stethoscope, inertial sensors as components of mutual guidance systems and various vehicle or vessel-steering or traverse-control systems, rotational motion measuring instruments, vibration measuring instruments, hydrophonic acoustical instruments, and other uses and application. Servo-sensors are omni-positional and work in the absence of gravitational field, which makes them particularly useful in space.

SUMMARY OF THE INVENTION

The present invention comprises rigid, shock resistant magnetohydrodynamic (MHD) perturbation sensing apparatus.

Preferably a rigid, shock resistant enclosure provides a housing having a sealed interior, in which a magnetohydrodynamic sensor and associated electronics are firmly disposed. The heart of the sensor is a generally tubular conduit having an internal channel containing an electrically conductive fluid such as mercury or an electrolyte. Preferably the conduit is of ring shaped dimensions, and an electrically conductive fluid is disposed for perturbation-responsive movement within the ring. A very strong magnetic field is set up perpendicularly with respect to the plane occupied by the conduit. Such a B field may appropriately be established by a pair of spaced apart magnets which have opposite poles disposed in a line generally normal to the plane of the conduit. One or more pairs of electrodes are secured to the conduit in a position normal to the magnetic field whereby to sense perturbations.

A pair of electrodes secured to sides of the conduit are coupled to a very high gain amplifier circuit for generating a signal suitable for analog-to-digital conversion. Preferably the digital signal is radioed to a remote position through a conventional digital transmitter where the information derived from the seismometer or geophone may be decoded.

The inventions described herein include an angular MHD continual period velocity sensor-accelerometer which functions in the absence of a gravitational field. A generally disc-shaped body substantially encapsulates a generally rectilinear, centrally disposed magnetic array and a cooperating ring-shape or circular channel through which an electrically conductive fluid may move in response to perturbations. Fluid disposed within the channel may also be forced to move by MHD phenomena. A pair of drive electrodes and a pair of sensing electrodes ar provided for information derivation and control.

The magnetic structure includes two pairs of rare earth magnets disposed on opposite sides of the magnetic gap occupied by the fluid containing channel. A plug is disposed concentrically within the housing, and a pair of voids are formed on opposite sides thereof between the plug and the inner periphery of an electrode ring. Preferably a fluid such as nitrogen gas is filled within this region to provide pressure compensation in response to movement of electrically conductive fluid.

An alternative sensor embodiment comprises a linear velocity sensor or accelerometer which incorporates the MHD teachings of the present invention. It includes a linear sensing channel for electrically conductive fluid established within a generally mushroom-shaped nonmagnetic, preferably plastic, housing which encloses a magnetic array of which projects from the rear of the housing. The magnetic array includes a generally C-shaped yoke having parallel ends which secure rare earth magnets above and below the linear fluid channel. The channel communicates with a pathway defined between the housing and an inner, upwardly projecting dampening plug which is secured internally of housing upon the magnetic array. It includes an upper point immediately below the top of the housing which divides the fluid into two separate portions. The electrically conductive fluid constrained within the channel and the region between the plug and the housing can "slosh" around this pathway in response to sufficient perturbations. A pair of electrodes disposed on opposite sides of the channel sense electric fields in a direction normal to both the magnetic field established by the aforementioned construction and the conductive fluid.

A similar linear servo-accelerometer is also disclosed. The accelerometer includes a generally C-shaped magnetic array which includes two pairs of outwardly projecting magnet support arms, and an electrode assembly adapted to be disposed between the gap formed by the arms which secure the rare earth magnets. A box-like electrode assembly includes a plurality of insulative sections which electrically isolate multiple electrodes from each other, and it establishes a pathway for fluid. A plurality of fluid baffles are preferably disposed within the channel to encourage laminar flow through the channel between the electrodes.

Also disclosed is an angular servo-accelerometer which comprises a central disc member which houses a ring like electrode assembly and which is positioned within a gap established a magnetic array. An electrode assembly includes a pair of spaced-apart accelerator electrodes and a pair of spaced apart, cooperating decelerator electrodes on opposite sides of the internal fluid channel. Generally arcuate baffles are disposed at spaced-apart intervals within the channel to reduce turbulence. A plurality of circuits for use with the disclosed apparatus are also employed.

Thus a broad object of the invention is to provide a shock resistant MHD sensor device which may monitor seismological activity or shock waves generated in response to earthquakes, nuclear test, other hydroacoustic soundings and the like.

A more particular object of the present invention is to provide a magnetohydrodynamic MHL sensor device of extremely shock resistant characteristics.

Yet another object of the present invention is to provide a MHD sensor device of the characteristics discussed above which may be reliably deployed in conjunction with an aircraft.

A still further object of the present invention is to provide a reliable and shock resistant MHD sensor device which will reliably operae on a tactical nuclear battlefield. It is a feature of the invention that its basic sensing mechanism is resistant to the EMP pulses generated when a nuclear weapon is detonated.

Another object is to provide a MHD sensor device of the type discussed of very wide band sensing characteristics.

A fundamental object of the present invention is to provide stable shock resistant hardware for sensing motion perturbations.

Another object is to provide magnetohydrodynamic sensing apparatus which can be employed for displacement sensing, velocity sensing, and acceleration sensing.

Another object is to provide an MHD accelerometer.

A related object is to provide an MHD servo-motion sensor.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
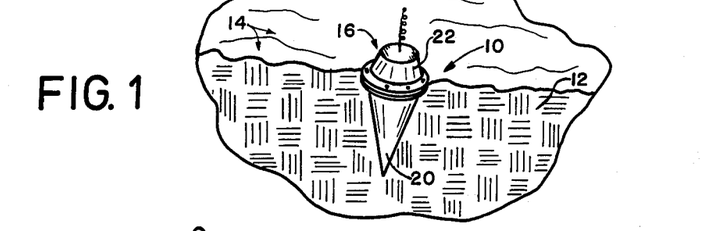
FIG. 1 is a pictorial view illustrating an magnetohydrodynamic (hereinafer MHD) geophone disposed within an area to be seismologically monitored.
Figure 2:
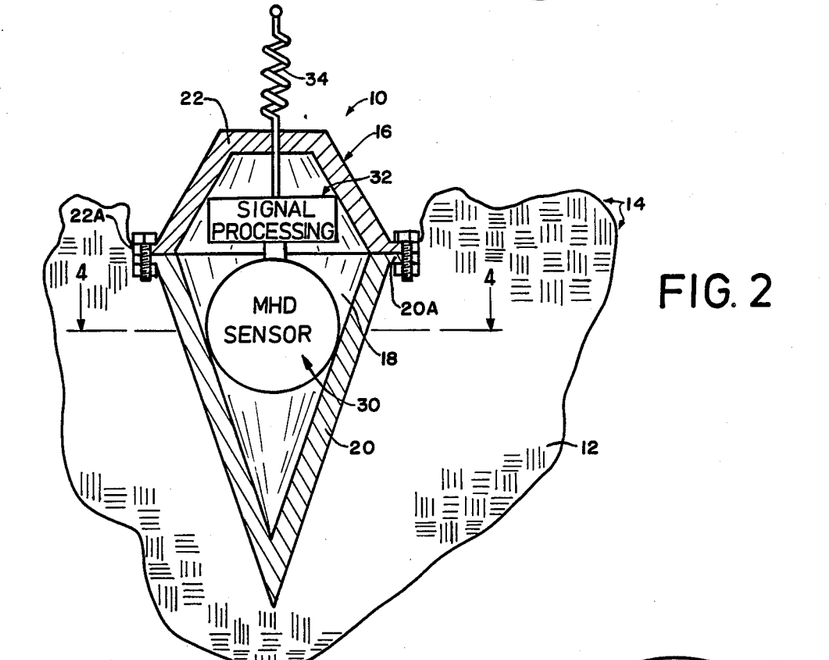
FIG. 2 is an enlarged, fragmentary sectional view of the geophone shown in FIG. 1.
Figure 3:
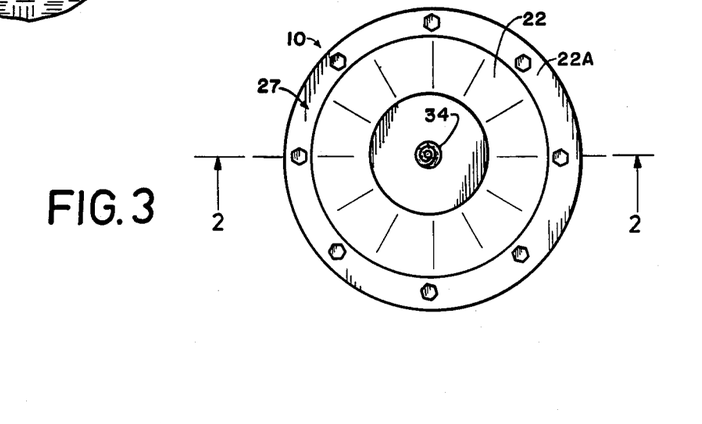
FIG. 3 is a top plan view of the geophone shown in FIGS. 1 and 2.

With initial reference to FIGS. 1-3, a geophone 10 is adapted to be firmly embedded within the unconsolidated bedrock 12 within a region 14 requiring seismological monitoring. The geophone 10 includes a rigid, preferably metallic, shock resistant housing 16 having an airtight and watertight, sealed interior 18. Housing 16 is formed from a generally conical bottom 20 which is flangibly coupled to frustrum-like top 22. Thus flange portion 22A is bolted to flange member 20A by plurality of nut and bolt combinations 27 of conventional configuration. A magnetohydrodynamic sensor, which will be discussed in detail hereinafter, has been generally designated by the reference numeral 30. Seismological vibrations detected by sensor 30 are amplified and processed by a circuit 32 for transmittal to a remote location through a conventional antenna 34. Although a variety of antennas will be useful, a helical antenna or equivalent is intended for communication with a companion satellite monitor. It is contemplated that standard vertical whip antennas or equivalents may be employed in conjunction with land based UHF or VHF radio monitoring.

Sensor 30 is in the form of a generally spherical body 31 properly machined to admit a generally ring shaped dual diameter tubular conduit, generally designated by the reference numeral 34. As best viewed in FIG. 5, conduit 34 includes a first half generally designated by the reference numeral 36, having predetermined diameter significantly greater than the diameter of accompanying ring half 38. An electrically conductive fluid such as mercury or a chemical electrolyte 40 is disposed within the conduit 34.

Figure 4:
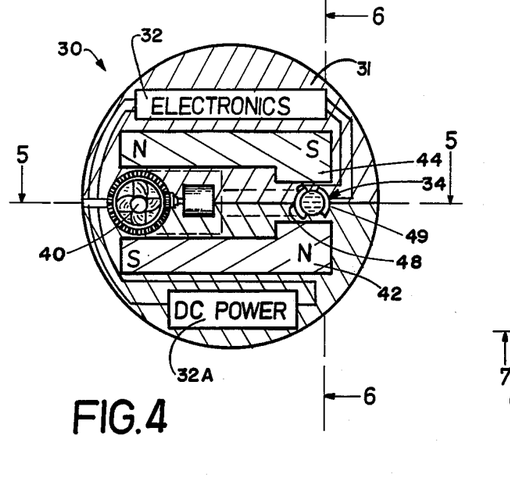
FIG. 4 is an enlarged fragmentary view illustrating the magnetohydrodynamic sensor, taken generally along the line 4—4 of FIG. 2.

A pair of magnets are disposed above and below the conduit 34. As best viewed in FIG. 4, for example, the position of the illustrated north and south poles generate an extremely effective magnetic field across the conduit, and the magnetic field is perpendicular to the plane occupied by the conduit. Because of the opposed alignment of magnets 42 and 44, the magnetic field vector directed across conduit ring portion 38 will be opposite in direction from the magnetic field directed across larger diameter conduit ring portion 38 will be opposite in direction from the magnetic field directed across larger diameter conduit ring portion 36. As best viewed in FIGS. 4 and 5, the conduit 34 includes at least one pair of electrodes 48, 49 for determining the electric field generated from the magnetohydrodynamics generally normal to the direction of the magnetic field set up by magnets 44 and 42 across the conduit 34. In response to vibration experienced by sensor 30, perturbations in the fluid 40 within conduit 34 are sensed and amplified by circuit 32.

Figure 5:
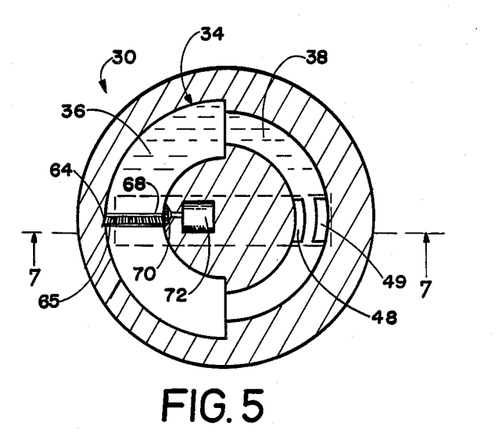
FIG. 5 is a sectional view taken generally along line 5—5 of FIG. 4.
Figure 6:
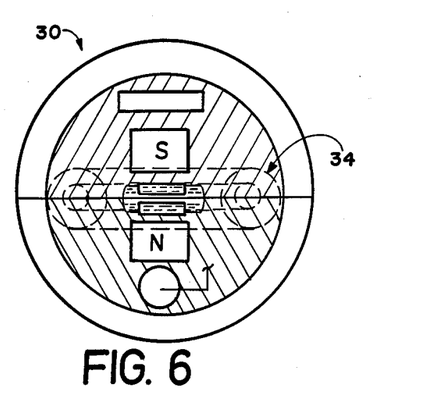
FIG. 6 is a sectional view taken generally along line 6—6 of FIG. 4.
Figure 7:
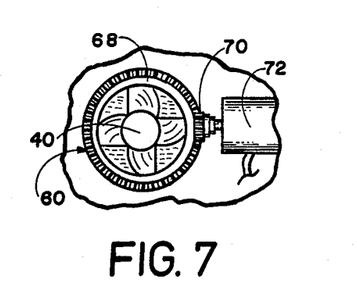
FIG. 7 is an enlarged fragmentary sectional view taken generally along line 7—7 of FIG. 5.

With reference now to FIGS. 5 and 7, means are preferably provided for circulating fluid within the ring shaped conduit 34. Circulation is necessary to enhance the usefulness of the magnetohydrodynamic by providing a fluid current velocity. It is contemplated that a variety of different pumps may be used by the present invention. One such pump which maybe employed includes a turbine blade, generally designated by the reference numeral 60 which is rotatably sealed by the mated terminal ends 64, 65 (FIG. 5) of opposite halves of ring larger diameter portion 36. A conventional ring gear 68 driven by worm 70 which is in turn controlled by motor 72 induces fluid motion interiorly of conduit 34. It should be appreciated that because of the larger diameter geometry of ring segment 36 relative to segment 38, a relatively small fluid velocity induced by turbine 60 within conduit portion 36 will be translated into a relatively high velocity in the lower volume ring segment 38 in fluid flow communication with segment 36. Thus the velocity of electrolyte or mercury transmitted through the ring half 38 between electrodes 48 and 49 will be relatively significant in the operating state.

Figure 8:
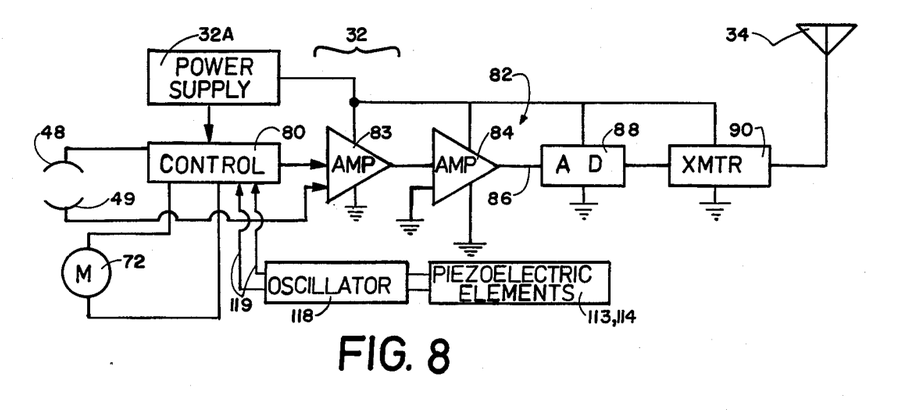
FIG. 8 is an electrical schematic diagram of a preferred control and radio circuit.

With reference now to FIG. 8, the circuit 32 is of relatively straight forward design. It must be appreciated that a variety of other sensing circuits may be employed with equal utility in conjunction with the MHD system of sensor 30. Circuit 32 includes a conventional battery power supply 32A which operates a conventional control circuit 80 for operating motor 72. electrodes 48, 49 transmit their signals through control network 80 to a high gain differential amplifier circuit generally designated by the reference numeral 82. This circuit includes a pair of operational amplifiers 83, 84 connected in cascade. Their analog output appearing on line 86 is transmitted to a conventional analog-to-digital converter 88 which operates at conventional pulse width modulated transmitter 90 for telemetry output via antenna 34, previously discussed.

Figure 9:
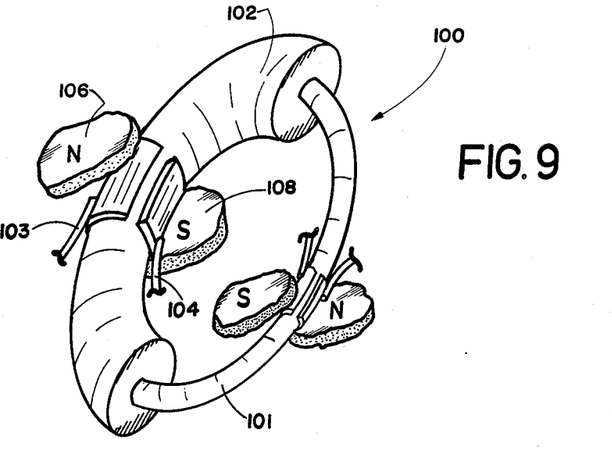
FIG. 9 is a pictorial view of an alternative sensor conduit employing reverse magnetohydrodynamic drive.

An alternative sensing conduit, also generally in the form of a toroid, is designated generally by the reference numeral 100 (FIG. 9). The larger diameter segment 102 includes a pair of electrodes (in electrical communication with the fluid within conduit 100) coupled to leads 103, 104. Magnet poles 106, 108 established a magnetic B field normal to the plane of conduit 100. An electrical voltage applied to lines 103, 104 thus establishes an electric field perpendicular to the magnetic field, and a reverse magnetohydrodynamic effect is established. In other words, a small flow of the electrically conductive fluid is established electrically. Relatively low fluid velocities within conduit segment 102 are translated into higher velocities within conduit segment 101, because of its lower diameter.

Figure 10:
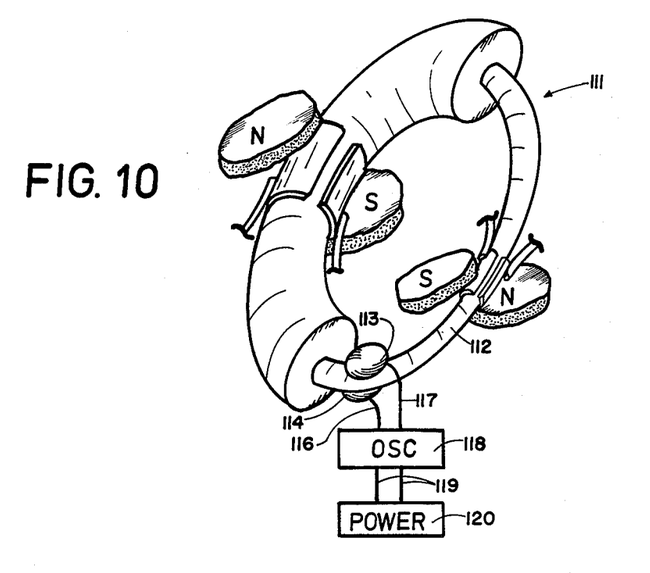
FIG. 10 is a pictorial view of an alternative conduit employing a fluid vibration system.

In FIG. 10 a further modification of a seismometer is shown. To generate molecular movement of the fluid within conduit 111, a pair of piezoelectric elements 113, 114 are located on opposite sides of the conduit segment 112; leads 116, 117 apply voltage from oscillator 118 across elements 113, 114 to generate vibrations. Power is supplied across lines 119 from source 120.

With reference now directed to FIGS. 11–15, an angular MHD continual period velocity sensor-accelerometer has been generally designated by the reference numeral 200. Sensor 200 functions in the absence of the gravitational field. A generally disc-shaped body 202 substantially encapsulates a generally rectilinear, centrally disposed magnetic array generally designated by the reference numeral 204. As best viewed in FIGS. 14 and 15, the body 202 surrounds an inner ring-shaped member 206 defining a generally circular channel 207 through which an electrically conductive fluid may move in response to perturbations as indicated generally by arrow 211 in FIG. 15. Fluid disposed within the channel 207 provided by member 206 may also be forced to move by MHD phenomena to be later described. The channel 207 is defined between an outer periphery 212 and an inner periphery 213 which extend vertically between the top 202A and the bottom 202B of body 202. A pair of drive electrodes generally designated by the reference numeral 220 comprise an outer electrode 221 and an inner electrode 222. A second pair of electrodes, generally designated by the reference numeral 224, include inner electrode 225 and outer electrode 226. Sensing electrodes 227 and 228 are aligned with electrodes 225 and 226 and are maintained in spaced apart relation by a pair of insulators generally designated by the reference numeral 229.

The magnetic structure 204 includes a rare earth magnet 230 spaced apart from a similar magnet 232 and similar magnets 234 and 235. These magnets disposed on opposite sides of the gap are occupied by channel 207. An upper flux distribution bar of generally C-shaped configuration has been designated by the reference numeral 240 and a similar lower bar is designated by the reference numeral 242. These bars are positioned about the covering surfaces 246 and 247 which abut opposite sides of a central plug 248 disposed within ring member 206. A pair of voids generally indicated by the reference numeral 250 are formed on opposite sides of the plug 248 between the plug 248 and the inner periphery 213 of the ring member 206. Preferably a fluid such as nitrogen gas is filled within this gap 250 to provide pressure compensation in response to movement of electrically conducted fluid to be disposed within the channel 207.

Sensor 200 can thus function in cooperation with the geophone as described above or can be employed as a stand-alone sensor unit for the other purposes referenced above. Electrical energization of lines 261, 262 can create a pulse of current which will produce motion of the electrically conductive fluid within channel 207 and the output experienced across electrodes 225 and 226 on lines 225A and 226A can be analyzed through circuits to be hereinafter described to provide motion sensing.

With reference now directed to FIGS. 16–20, an alternative embodiment has been generally designated by the reference numeral 300. Sensor 300 comprises a linear velocity sensor or accelerometer which incorporates the MHD teachings of the present invention. It includes a linear sensing channel for electrically conductive fluid.

Figures 11, 12, 13, 14, 15, 16, 17:
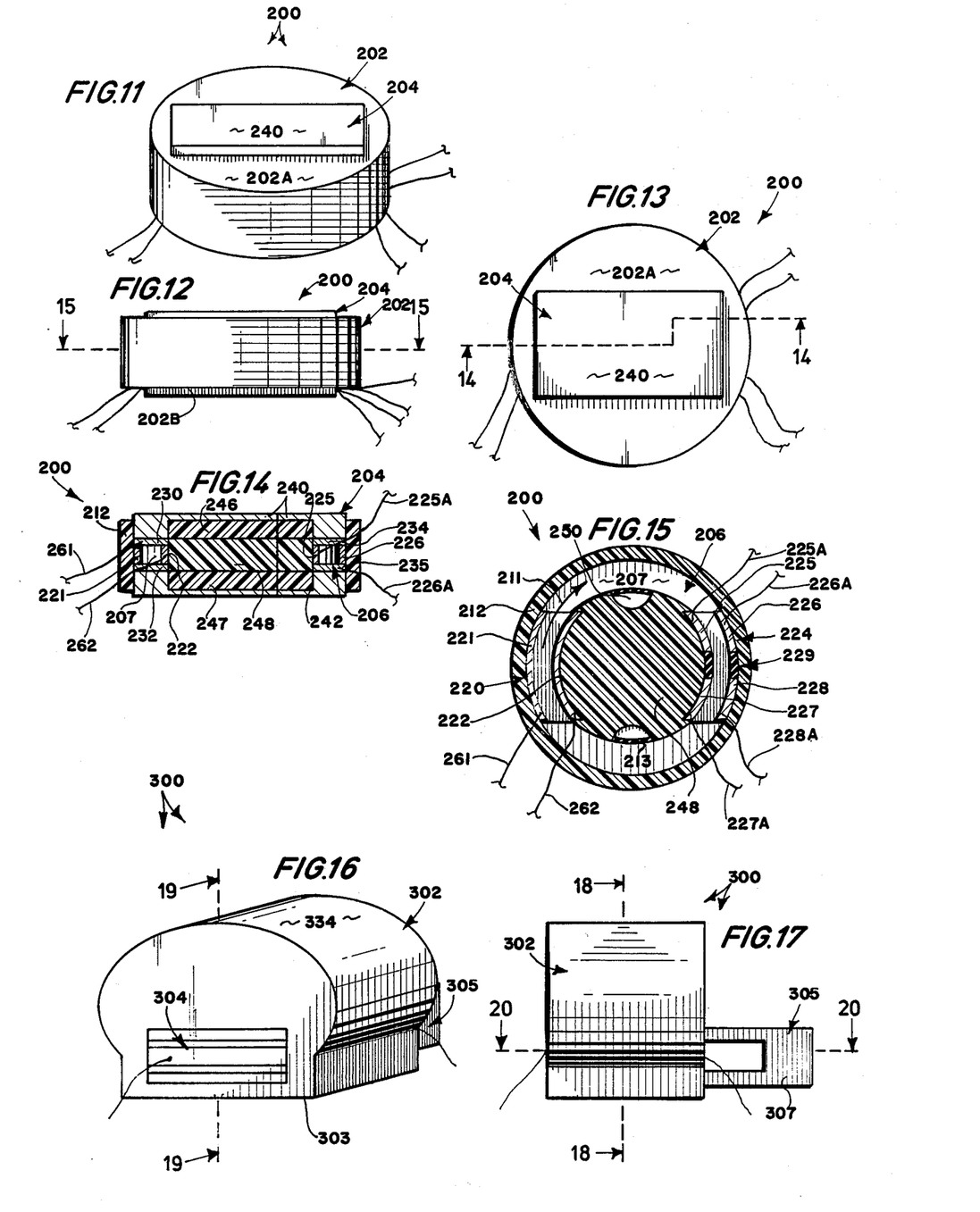
FIG. 11 is an isometric view of an angular MHD, continual period velocity sensor-accelerometer constructed in accordance with the best mode of the preferred invention.
FIG. 12 is a front plan view of the MHD sensor of FIG. 11.
FIG. 13 is a top plan view of the sensor of FIGS. 11 and 12.
FIG. 14 is a sectional view taken generally along lines 14—14 of FIG. 13.
FIG. 15 is a sectional view taken generally along line 15—15 of FIG. 12 in the direction of the arrows.
FIG. 16 is an isometric view of a linear velocity sensor-accelerometer constructed in accordance with an alternative mode of the improved invention.
FIG. 17 is a side elevational view of the sensor of FIG. 16, taken from a position generally to the right of FIG. 16.
Figure 18:
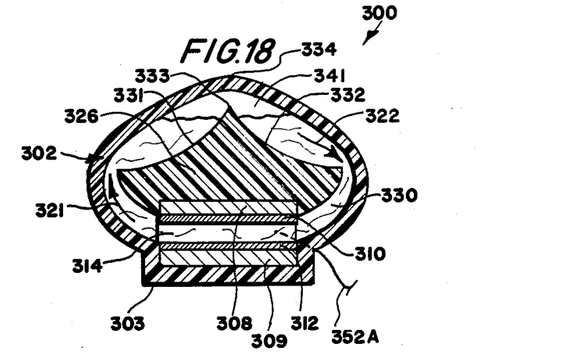
FIG. 18 is a sectional view taken generally along line 18—18 of FIG. 17.
Figure 19:
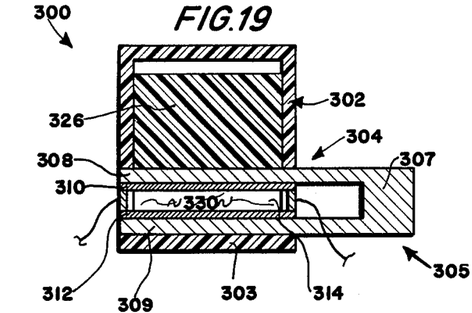
FIG. 19 is a sectional view taken generally along line 19—19 of FIG. 16.

Sensor 300 includes a generally mushroom-shaped nonmagnetic, preferably plastic, housing 302 which encloses the magnetic array 304, a portion 305 of which projects rearwardly from the rear of the housing 302. The upper portion of the housing 302 is integral with a lower generally rectangular portion generally designated by the reference numeral 303 which forms a supportive base for the apparatus. This magnetic structure 305 essentially includes a generally C-shaped yoke 307 the parallel ends 308 and 309 of which secure rare earth magnets 310 and 312 above and below a linear channel 314 filled with an electrically conductive fluid 330. As viewed in FIG. 18, channel 314 intercommunicates with a pathway generally indicate by arrows 321 and 322 defined between the body of housing 302 and an inner, upwardly projecting dampening plug 326. Plug 326 is secured internally of housing 302 upon the magnetic array 307 and it includes opposite sides 331 and 332 which converge at a point 333 immediately below the top 334 of the housing 302. As best noted in FIG. 18, the electrically conductive fluid 330 constrained within channel 314 and within that area defined between plug 326 and housing 302 can "slosh" around this pathway in response to strong enough vibration, it can traverse the hollow volume 341 between the top 334 of the housing 302 and the plug point 333. Region 341 is filled with an inert gas such as nitrogen. Plug point 333 may be omitted to increase the volume of the "bubble" of gas 331 and allow it move more freely.

Figure 20:
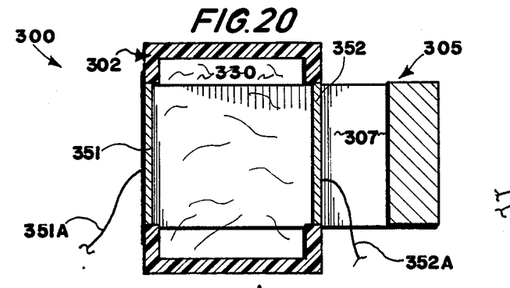
FIG. 20 is a sectional view taken generally along line 20—20 of FIG. 17.

As best viewed in FIG. 20, a pair of electrodes generally designated by the reference numerals 351 and 352 are disposed on opposite sides of the channel 330 to sense electric fields in a direction normal to both the magnetic field established by the aforementioned construction and the fluid traveling in channel 314. These electrodes include electric lines 351A and 352A for interconnection to circuits to be hereinafter described.

Such a linear velocity sensor or accelerometer 300 would be particularly useful in such applications as impact gauges, electronic stethoscopes, and seismic displacement meters.

Figure 21:
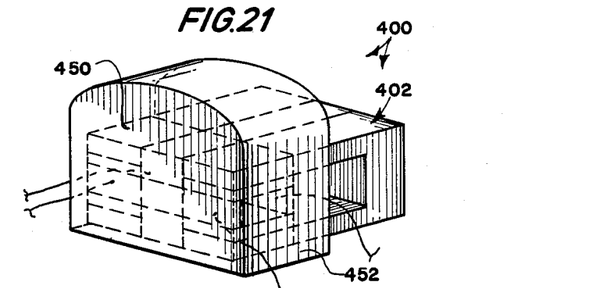
FIG. 21 is a fragmentary isometric view of an alternative MHD, linear servo velocity-accelerometer meter incorporating twin magnet design, with portions thereof shown in dashed lines for clarity.
Figures 22, 23:
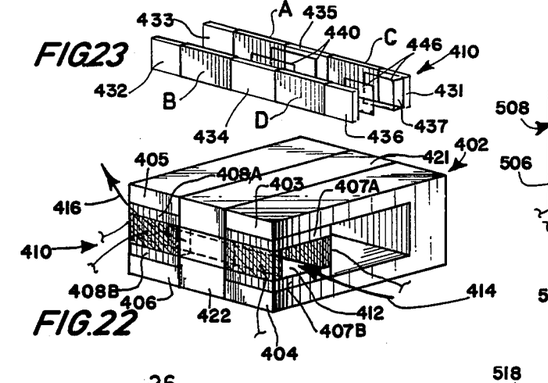
FIG. 22 is an enlarged, fragmentary isometric view of the magnet and electrode apparatus of the servo of FIG. 21, with portions thereof shown in section or dashed lines for clarity.
FIG. 23 is a fragmentary isometric view of the electrode structure of the servo of FIGS. 21 and 22.

With reference now directed to FIGS. 21-23, a lines servo-accelerometer has been generally designated by the reference numeral 400. This accelerometer includes a generally C-shaped magnetic array generally indicated by the reference numeral 402 which includes two pairs of outwardly projecting magnet support arms. A first pair consists of arms 403 and 404, and the second pair consists of arms 405 and 406.

An electrode assembly generally designated by the reference numeral 410 (FIG. 23) is adapted to be disposed between the gap formed by arms 403, 405 and arms 404, 406 respectively. Arms 403 and 404 secure magnets 407A and 407B. The generally box-like body 431 of the electrode assembly 410 includes a plurality of insulative sections 432-437 which electrically isolate the electrodes A-D. A first pair of baffles 440 are disposed generally between insulated portions 434 and 435. A second pair of baffles 446 emanates from the insulative portion 437 of the electrode assembly 410. These baffles 440 and 446 are employed to encourage laminar flow through the channel between the electrodes. In other words, baffles 440 and 446 encourage the production of fluid turbulence so as to insure linear physical displacement of the conductive fluid in response to vibration of the apparatus.

Arms 405 and 406 secure magnets 408A and 408B. A spacer 421 is disposed between arms 403 and 405 and a cooperating lower spacer 422 is disposed between arms 406 and 404 on opposite sides of the fluid-conductive channel 412. A linear fluid-conductive channel generally designated by the reference numeral 412 permits flow of the electrically-conductive fluid therethrough as referenced by arrows 414 and 416. The electrode assembly includes decelerator electrodes A and B and accelerator electrodes C and D which are disposed so as to sense the electric field normal to both the established magnetic field and the direction of fluid travel.

Fluid traveling as indicated by arrows by 414 and 416 (or fluid traveling in the direction opposite therefrom) is constrained within an interior channel 450 defined within the housing 452 (FIG. 21). Housing 452 may be constructed substantially similarly to housing 302 which is substantially identical thereto. Fluid may travel upwardly within the housing as indicated by arrows 321 and 322 previously discussed. Housing 452 thus cooperates with the linear fluid-conductive channel essentially within the electrode assembly 410.

Sensor 400 is especially useful for inertial sensing in guidance and automatic control systems. The servo-accelerometer allows the designer to reduce the influences of friction, turbulence, sloshing, etc. and thus results in improved accuracy.

Figure 24:
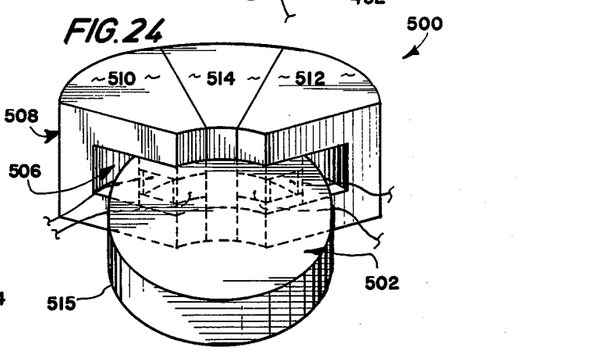
FIG. 24 is a fragmentary isometric view of an angular MHD servo sensing unit for use as either a velocity meter or an accelerometer, with portions thereof shown in section or dashed lines for clarity.
Figure 25:
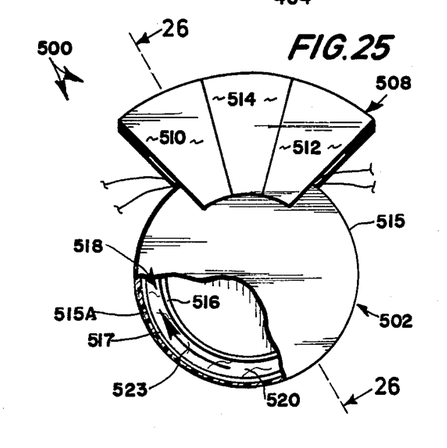
FIG. 25 is a fragmentary top plan view of the servo of FIG. 24.
Figure 26:
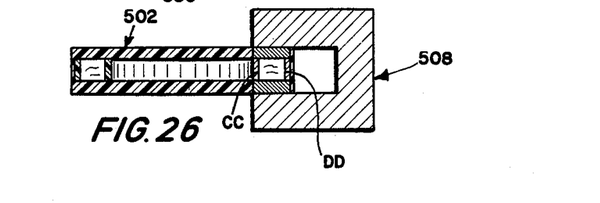
FIG. 26 is a sectional view taken generally along line 26—26 of FIG. 25.

With reference now directed to FIGS. 24-26, an angula servo-accelerometer has been generally designated by the reference numeral 500. It includes a central disc member 502 which functions as an electrode housing and which is positioned within a gap 506 established by the magnetic array 508. Magnetic array 508 and central disc member 502 are operationally secured together within a suitable structurally sound housing which will include a suitable battery power supply along with the electronic circuitry to be hereinafter described. The physical construction of the housing and the internal components will be similar to those of the previously discussed geophone.

Figure 27:
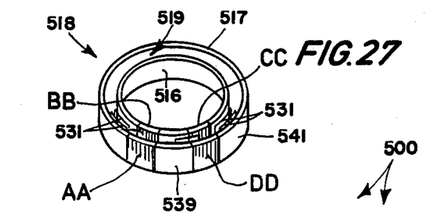
FIG. 27 is an enlarged isometric view of the preferred fluid containment ring and electrode assembly employed with the servo of FIGS. 24-26.

Array 508 includes a pair of generally segment-shaped magnets 510 and 512 separated by a similarly shaped spacer 514. Disc 502 includes a generally circular outer radial periphery 515 comprising an outer wall 515A and an inner guide wall 516 of the electrode assembly 518. An electrode assembly generally designated by the reference numeral 518 includes an outer wall 517 concentrically spaced-apart from its inner wall 516 is concentrically housed within disc 502 and it establishes a channel generally designated by the reference numeral 519 containing electrically-conductive fluid 520 which is free to move within channel 519 as indicated generally by the arrow 523. The electrode assembly 518 includes a pair of spaced-apart accelerator electrodes AA and BB on opposite sides of the channel 519, and a pair of spaced apart, cooperating decelerator electrodes CC and DD. The electrodes are separated by insulative portions of the electrode assembly such as segments 539 and 541. As indicated best in FIG. 27, a plurality of generally arcuate baffles 531 may be disposed at spaced-apart intervals within the channel to reduce turbulence.

Figure 28:
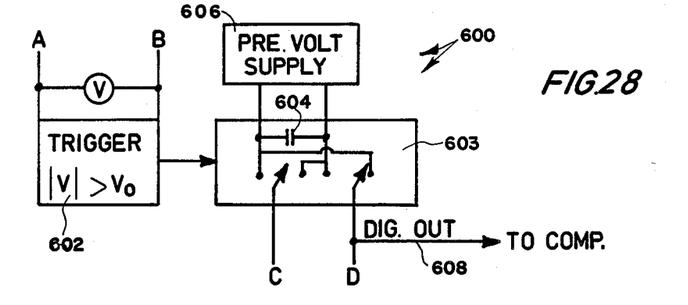
FIG. 28 is a schematic diagram of an optional pulsing circuit for use with the instant invention.

With reference now to FIG. 28, the circuit 600 thereshown includes a trigger circuit 602 responsive to the electrodes A an B (or AA and BB). The trigger 602 is associated with capacitive discharge circuit 603 which includes a capacitor 604 loaded by a precision voltage supply 606. This circuit is utilized to Null Velocity in the linear or angular accelerometer. Digital pulses are available on line 608 for analysis by an external computer. Preferably three sensors are employed resulting in three pairs of contributing electrodes all of which are connected to circuits similar to circuit 600 so that phase between generating pulses may be discerned. In any event it is to be appreciated that by using two pairs of electrodes in the previously described sensors the voltage may be applied from a first pair and derived from a second pair. In the case when three are applied, as when there are movements in all three orthogonal directions, the sensor apparatus can provide data of the type conventionally processed by computers for position monitoring.

Figure 29:
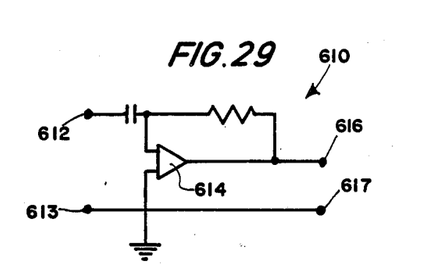
FIG. 29 is a schematic view of a differentiator circuit for use with the present invention to convert motion sensing to velocity sensing.
Figure 30:
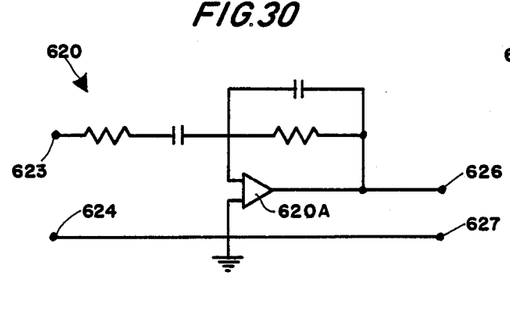
FIG. 30 is a schematic diagram of a circuit for use in deriving acceleration data from sensed motion data; and, FIG. 31 is a pictorial view illustrating a typical MHD induced voltage sensing coil.

With reference now to FIGS. 29 and 30, circuit 610 comprises a differentiator circuit which receives an input across nodes 612 and 613 derived from electrodes of the previously described sensors. OP AMP 614 is configured to output the time-based derivative of its input signal appearing on nodes 612 and 613. Thus if position data is inputted across nodes 612 and 613, then velocity data will appear across nodes 616 and 617. Circuit 30 includes an OP AMP 620 adapted to compute the second differential of time-based position data appearing across its nodes 623 and 624. Thus acceleration information is outputted across nodes 626 and 627.

Figure 31:
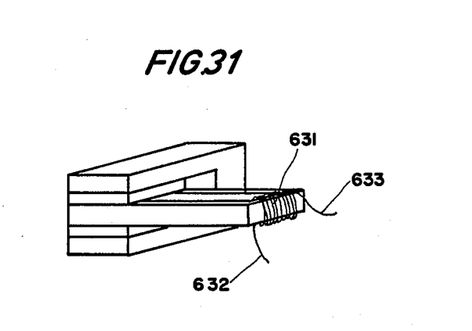

FIG. 31 illustrates that a coil of wire 631 may be disposed about one of the external arms of the magnetic arrays previously discussed. Induced currents in this metallic structure would cause voltage to be generated across lines 632 and 633 which may be delivered to a conventional high-gain amplifier for processing by circuits 610 or 620 as described.

From the foregoing, it will be seen that this invention is one well adapted to obtain all the ends and objects herein set forth, together with other advantages which are obvious an which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A magnetohydrodynamic fluid transducer for use within a motion sensor, displacement meter, velocity meter, accelerometer, and a servo-accelerometer, for sensing perturbations, said transducer comprising:
a magnetohydrodynamic fluid generator
means defining a circular fluid flow channel containing an electrically conductive fluid, said channel occupying a plane;
magnetic means for establishing a magnetic field through said channel perpendicular to said plane; and,
means for sensing perturbations in the electric field normal to said magnetic field for monitoring motion disturbances, said means for sensing perturbations comprising electrode means oriented transversely with respect to said magnetic field for sensing said electrical field and high gain amplifier means for greatly amplifying said perturbations.

2. The transducer as defined in claim 1 wherein said means for establishing a circular channel is disposed within a circular, disk like enclosure having a circular interior, said interior includes a central plug for bracing the channel, and said plug defines voids for gas pressurization to help balance varying fluid pressures within said channel.

3. The transducer as defined in claim 1 wherein said means for defining a fluid flow channel comprises a rigid, hollow, ring shaped enclosure having a circumference and said magnetic means comprises at least one segment-shaped magnet having a magnet gap, at least a portion of the circumference of said enclosure being operatively disposed within said magnet gap.

4. The transducer as defined in claim 3 wherein said ring shaped enclosure has an inner periphery and an outer periphery, and said electrode means comprises at least one pair of electrodes consisting of a first element disposed on said inner periphery and a cooperating second element disposed upon said outer periphery.

5. The transducer as defined in claim 3 wherein said magnetic means comprises a plurality of cooperating segment shaped, spaced apart magnets each having gaps, said means for defining a fluid flow channel comprises a rigid, hollow, ring shaped enclosure at least a portion of which is functionally disposed within said gaps, and said magnets are separated by segment shaped spacers for bracing said enclosure.

6. The transducer as defined in claim 5 wherein said ring shaped enclosure has an inner periphery and an outer periphery, and said electrode means comprises at least one pair of electrodes consisting of a first element disposed on said inner periphery and a cooperating second element disposed upon said outer periphery.

7. The transducer as defined in claim 6 including non-magnetic central reinforcement means disposed within the center of said enclosure for bracing said transducer.

8. The transducer as defined in claim 7 including electrode magnetohydrodynamic means for periodically circulating said fluid within said channel.

9. An magnetohydrodynamic transducer comprising:
a shock resistant housing having an interior, the housing adapted to be firmly attached to an area subject to perturbations to be monitored;
a magnetohydrodynamic fluid generator disposed within said housing for detecting perturbations, said generator comprising:
a tubular conduit containing an electrically conductive fluid, said conduit including a substantially linear portion;
magnetic means for establishing a magnetic field perpendicular to said plane of said substantially linear portion of said conduit; and,
electrode means for sensing perturbations in the electric field normal to said magnetic field for monitoring perturbations.

10. The transducer as defined in claim 9 wherein said housing surrounds an internal plug, a fluid containment region is established interiorly between said housing and said plug, and said conduit being in fluid flow communication with said containment region.

11. The transducer as defined in claim 10 wherein said plug includes a top point disposed within said housing which divides the containment region into separate parts.

12. The transducer as defined in claim 11 wherein a void is defined between the top of said plug and said housing, said void adapted to receive a charge of gas for pressurizing said transducer housing.

* * * * *